United States Patent
Chaddha et al.

(10) Patent No.: US 6,173,317 B1
(45) Date of Patent: Jan. 9, 2001

(54) STREAMING AND DISPLAYING A VIDEO STREAM WITH SYNCHRONIZED ANNOTATIONS OVER A COMPUTER NETWORK

(75) Inventors: Navin Chaddha, Sunnyvale; Anoop Gupta, Menlo Park; Edward Wang, Oakland; Prasad Vellanki, Milpitas; David del Val; Anthony Cannon, both of Mountain View; Dawson Dean, Piedmont, all of CA (US)

(73) Assignee: Microsoft Corporation, Redmond, WA (US)

( * ) Notice: Under 35 U.S.C. 154(b), the term of this patent shall be extended for 0 days.

(21) Appl. No.: 08/819,585

(22) Filed: Mar. 14, 1997

(51) Int. Cl.⁷ .................................................. H04N 7/10

(52) U.S. Cl. ................................ 709/219; 348/7; 455/4.2; 345/328

(58) Field of Search .................................. 348/7, 10, 12, 348/13; 345/327, 328; 455/4.2, 6.3, 5.1; 709/217–219

(56) References Cited

U.S. PATENT DOCUMENTS

| | | |
|---|---|---|
| 4,675,532 | 6/1987 | Carson ................................ 250/578 |
| 4,750,367 | 6/1988 | Bernatets ............................. 73/602 |
| 4,827,533 | 5/1989 | Tanaka ................................. 382/54 |
| 4,931,950 | 6/1990 | Isle et al. ............................ 364/513 |
| 4,941,190 | 7/1990 | Joyce .................................... 382/54 |
| 4,982,280 | 1/1991 | Lyon et al. ........................... 358/105 |
| 5,091,925 | 2/1992 | Haendle et al. ...................... 378/99 |
| 5,119,474 | 6/1992 | Beitel et al. ......................... 395/154 |
| 5,253,045 | 10/1993 | Lippel .................................. 358/37 |
| 5,274,758 | 12/1993 | Beitel et al. ......................... 395/154 |
| 5,307,456 | * 4/1994 | MacKay ............................... 345/328 |
| 5,309,237 | 5/1994 | Singh .................................. 348/607 |
| 5,329,314 | 7/1994 | Correa et al. ....................... 348/448 |
| 5,335,019 | 8/1994 | Herz et al. ........................... 348/607 |

(List continued on next page.)

OTHER PUBLICATIONS

Moura, J.M. et al., "Retrieving Quality Video Across Hetergeneous Networks—Video Over Wireless", *IEEE Personal Communications*, 44–54, (Feb. 1996).

Primary Examiner—Victor R. Kostak
(74) Attorney, Agent, or Firm—Schwegman, Lundberg, Woessner & Kluth, P.A.

(57) ABSTRACT

Client computer(s) retrieve and display synchronized annotated multimedia streams from servers dispersed over a diverse computer network which includes local area networks (LANs) and/or wide area networks (WANs) such as the internet. Multimedia streams provided to the client computer(s) can include a compressed video stream for display in a video window and an accompanying compressed audio stream. Annotations, i.e., displayable events, include textual/graphical data in the form of HTML pages with Java applets to be displayed in one or more event windows. The video/audio and annotation streams are produced and then stored in stream server(s). Annotation streams include annotation frames which provide either pointer(s) to the event(s) of interest or include displayable data embedded within the annotation stream. Accordingly, each annotation frame includes either an event locator or an event data. In addition, each annotation frame includes an event time marker which corresponds to the time stamp(s) of associated video frame(s) within the video stream. Examples of embedded displayable data include ticker tape data embedded within the annotation stream. Examples of event locators to displayable events include URL addresses pointing to HTML web pages. Video/audio streams and annotation streams are provided by the stream server(s) to the client computer(s) in a coordinated manner, so that the client computer(s) is able to synchronously display the video frames and displayable event(s) in a video window and event window(s), respectively.

39 Claims, 15 Drawing Sheets

U.S. PATENT DOCUMENTS

| | | | |
|---|---|---|---|
| 5,396,497 | 3/1995 | Veltman | 370/100.1 |
| 5,426,427 | 6/1995 | Chinnock et al. | 340/827 |
| 5,455,910 | 10/1995 | Johnson et al. | 395/650 |
| 5,481,543 | 1/1996 | Veltman | 370/94.1 |
| 5,487,167 | 1/1996 | Dinallo et al. | 395/650 |
| 5,502,727 | 3/1996 | Catanzaro et al. | 370/94.2 |
| 5,512,938 | 4/1996 | Ohno | 348/15 |
| 5,521,918 | 5/1996 | Kim | 370/61 |
| 5,521,988 | 5/1996 | Li et al. | 382/248 |
| 5,524,193 | 6/1996 | Covington et al. | 395/154 |
| 5,533,021 | 7/1996 | Branstad et al. | 370/60.1 |
| 5,537,408 | 7/1996 | Branstad et al. | 370/79 |
| 5,543,850 | 8/1996 | Pratt et al. | 348/617 |
| 5,555,028 | 9/1996 | Kim | 348/607 |
| 5,561,724 | 10/1996 | Kido et al. | 382/264 |
| 5,577,258 | 11/1996 | Cruz et al. | 395/800 |
| 5,583,652 | 12/1996 | Ware | 386/75 |
| 5,583,980 | 12/1996 | Anderson | 395/173 |
| 5,592,231 | 1/1997 | Clatanoff et al. | 348/452 |
| 5,594,911 | 1/1997 | Cruz et al. | 395/800 |
| 5,600,775 | 2/1997 | King et al. | 395/806 |
| 5,621,728 | 4/1997 | Lightfoot et al. | 370/60.1 |
| 5,623,690 | 4/1997 | Palmer et al. | 395/806 |
| 5,635,979 | 6/1997 | Kostreski et al. | 348/13 |
| 5,664,044 | 9/1997 | Ware | 386/75 |
| 5,687,372 | 11/1997 | Hotea et al. | 395/675 |
| 5,699,484 | 12/1997 | Davis | 345/2.28 |
| 5,731,840 | 3/1998 | Kikuchi et al. | 348/416 |
| 5,760,838 * | 6/1998 | Adams et al. | 345/327 |
| 5,761,663 | 6/1998 | Lagarde et al. | 707/10 |
| 5,764,307 | 6/1998 | Ozcelik et al. | 348/608 |
| 5,768,440 | 6/1998 | Campanelli et al. | 382/261 |
| 5,768,533 | 6/1998 | Ran | 395/200.77 |
| 5,771,318 | 6/1998 | Fang et al. | 382/261 |
| 5,774,666 * | 6/1998 | Portuesi | 348/473 |
| 5,778,187 | 7/1998 | Monteiro et al. | 395/200.61 |
| 5,805,804 | 9/1998 | Laursen et al. | 395/200.02 |
| 5,812,702 | 9/1998 | Kundu | 382/260 |
| 5,818,441 * | 10/1998 | Throckmorton et al. | 345/328 |
| 5,832,134 | 11/1998 | Avinash et al. | 382/257 |
| 5,844,627 | 12/1998 | May et al. | 348/607 |
| 5,854,887 * | 12/1998 | Kindell et al. | 345/327 |
| 5,862,339 | 1/1999 | Bonnaure et al. | 395/200.57 |
| 5,884,004 | 3/1999 | Sato et al. | 386/98 |
| 5,892,535 | 4/1999 | Allen et al. | 348/9 |
| 5,892,915 | 4/1999 | Duso et al. | 395/200.49 |
| 5,903,563 | 5/1999 | Rashid et al. | 370/395 |
| 5,907,322 * | 5/1999 | Kelly et al. | 345/327 |
| 5,918,002 | 6/1999 | Klemets et al. | 395/182.16 |
| 5,929,849 * | 2/1999 | Kikinis | 345/327 |
| 5,929,850 * | 7/1999 | Broadwin et al. | 345/327 |

* cited by examiner

STREAMING AND DISPLAYING A VIDEO STREAM WITH SYNCHRONIZED ANNOTATIONS OVER A COMPUTER NETWORK

CROSS REFERENCE TO RELATED APPLICATIONS

This application is related to co-pending U.S. application Ser. No. 08/818,805, filed on Mar. 14, 1997, entitled "Method and Apparatus for Implementing Motion Detection in Video Compression," U.S. application Ser. No. 08/819, 507, filed Mar. 14, 1997, entitled "Digital Video Signal Encoder and Encoding Method," U.S. application Ser. No. 08/818,804, filed on Mar. 14, 1997, entitled "Production of a Video Stream with Synchronized Annotations over a Computer Network," U.S. application Ser. No. 08/819,586, filed on Mar. 14, 1997, entitled "Method and Apparatus for Implementing Control Functions in a Streamed Video Display System," U.S. application Ser. No. 08/818,769, filed on Mar. 14, 1997, entitled "Method and Apparatus for Automatically Detecting Protocols in a Computer Network," U.S. application Ser. No. 08/818,127, filed on Mar. 14, 1997, entitled "Dynamic Bandwidth Selection for Efficient Transmission of Multimedia Streams in a Computer Network," U.S. application Ser. No. 08/819,585, filed on Mar. 14, 1997, entitled "Streaming and Display of a Video Stream with Synchronized Annotations over a Computer Network," U.S. application Ser. No. 08/818,664, filed on Mar. 14, 1997, entitled "Selective Retransmission for Efficient and Reliable Streaming of Multimedia Packets in a Computer Network," U.S application Ser. No. 08/819,579, filed Mar. 14, 1997, entitled "Method and Apparatus for Table-Based Compression with Embedded Coding," U.S. application Ser. No. 08/818,826, filed on Mar. 14, 1997, entitled "Digital Video Signal Encoder and Encoding Method," all filed concurrently herewith, U.S. application Ser. No. 08/822,156, filed on Mar. 17, 1997, entitled "Method and Apparatus for Communication Media Commands and Data Using the HTTP Protocol," provisional U.S. application Ser. No. 60/036,662, filed on Jan. 30, 1997, entitled "Methods and Apparatus for Autodetecting Protocols in a Computer Network," U.S. application Ser. No. 08/625,650, filed on Mar. 29, 1996, entitled "Table-Based Low-Level Image Classification System," U.S. application Ser. No. 08/714, 447, filed on Sep. 16, 1996, entitled "Multimedia Compression System with Additive Temporal Layers," and is a continuation-in-part of U.S. application Ser. No. 08/623, 299, filed on Mar. 28, 1996, entitled "Table-Based Compression with Embedded Coding," which are all incorporated by reference in their entirety for all purposes.

BACKGROUND OF THE INVENTION

1. Field of the Invention

The present invention relates to multimedia communications. More particularly, the present invention relates to the synchronous delivery of annotated multimedia streams over a diverse computer network.

2. Description of the Related Art

With the proliferation of connections to the internet by a rapidly growing number of users, the viability of the internet as a widely accepted medium of communication has increased correspondingly. Bandwidth requirements can vary significantly depending on the type of multimedia data being delivered. For example, a low resolution, low frame rate video telephone call may require only an ISDN connection, while a high resolution video broadcast of a live event to a large group of viewers may require the bandwidth of a T1 connection. Hence, the ability to deliver of multimedia data over the internet is limited by bandwidth capacity and cost of the network connection and also by the computational capability of the server and client computers.

Existing conventional internet applications, such as electronic mailers and web browers, are capable of transferring and presenting textual and graphical information. However, none of these individual internet applications effectively provide synchronous delivery of a combination of diverse multimedia streams in a coherent and integrated manner. This is because executing several independent and unrelated applications to present the diverse combination of multimedia streams on a client computer can result in a hodgepodge of poor quality, incompatible and/or incoherent presentations.

In view of the foregoing, there are desired improved techniques for reliably providing a multimedia stream such as a video and audio stream, together with annotations such as textual and graphical information in an integrated seamless package to client computer(s), while efficiently utilizing the network resources and consuming minimal computational cycles on the client computer(s).

SUMMARY OF THE INVENTION

The present invention enables client computer(s) to retrieval and display synchronized annotated multimedia streams from servers dispersed over a diverse computer network which includes local area networks (LANs) and/or wide area networks (WANs) such as the internet. Multimedia streams provided to the client computer(s) can include a compressed video stream for display in a video window and an accompanying compressed audio stream. Annotations, i.e., displayable events, include textual/graphical data in the form of HTML pages with Java applets to be displayed in one or more event windows.

In one embodiment, the video/audio and annotation streams are produced by a capture module and an author module, and then stored in stream server(s) to be provided to one or more client computer(s) upon request. The capture module compresses the video stream using a suitable compression format, depending on the desired resolution(s) and frame rate(s). The author module then generates synchronization scripts which include annotation streams which are synchronized with the compressed video/audio streams.

In this embodiment, annotation streams include annotation frames which provide either pointer(s) to the event(s) of interest or include displayable data embedded within the annotation stream. Accordingly, each annotation frame includes either an event locator or an event data. In addition, each annotation frame includes an event time marker which corresponds to the time stamp(s) of associated video frame (s) within the video stream. Examples of embedded displayable data include ticker tape data embedded within the annotation stream. Examples of event locators to displayable events include URL addresses pointing to HTML web pages. Note that an event time marker need not be identical to a corresponding video time stamp. The client computer is capable of switching to a new displayable event together with a video frame or in between two video frames.

Video/audio streams and annotation streams are provided by the stream server(s) to the client computer(s) in a coordinated manner, so that the client computer(s) is able to synchronously display the video frames and displayable event(s) in a video window and event window(s), respectively. In this embodiment, annotation streams include a flipper stream for locating HTML pages and a ticker stream which include ticker (tape) data.

The client computer also provides a table of contents displayed concurrently with the video window and the event window. The table of contents includes content labels which enable the viewer to skip forward or backward to one or more predetermined locations in the video stream.

These and other advantages of the present invention will become apparent upon reading the following detailed descriptions and studying the various figures of the drawings.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order to not unnecessarily obscure the present invention.

Figure 1:
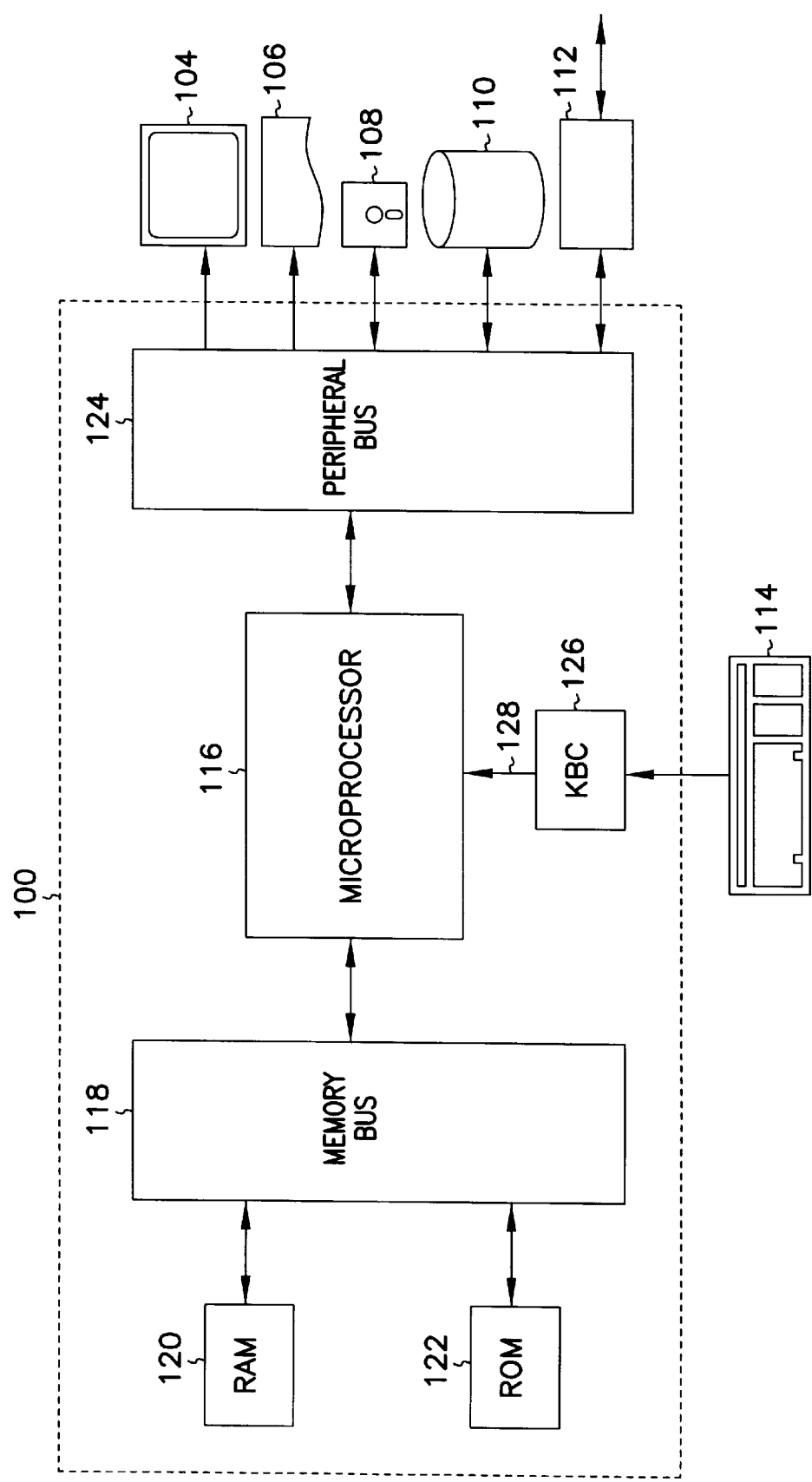
FIG. 1 is a block diagram of an exemplary computer system for practicing the various aspects of the present invention.

FIG. 1 is a block diagram of an exemplary computer system 100 for practicing the various aspects of the present invention. Computer system 100 includes a display screen (or monitor) 104, a printer 106, a floppy disk drive 108, a hard disk drive 110, a network interface 112, and a keyboard 114. Computer system 100 includes a microprocessor 116, a memory bus 118, random access memory (RAM) 120, read only memory (ROM) 122, a peripheral bus 124, and a keyboard controller 126. Computer system 100 can be a personal computer (such as an Apple computer, e.g., an Apple Macintosh, an IBM personal computer, or one of the compatibles thereof), a workstation computer (such as a Sun Microsystems or Hewlett-Packard workstation), or some other type of computer.

Microprocessor 116 is a general purpose digital processor which controls the operation of computer system 100. Microprocessor 116 can be a single-chip processor or can be implemented with multiple components. Using instructions retrieved from memory, microprocessor 116 controls the reception and manipulation of input data and the output and display of data on output devices.

Memory bus 118 is used by microprocessor 116 to access RAM 120 and ROM 122. RAM 120 is used by microprocessor 116 as a general storage area and as scratch-pad memory, and can also be used to store input data and processed data. ROM 122 can be used to store instructions or program code followed by microprocessor 116 as well as other data.

Peripheral bus 124 is used to access the input, output, and storage devices used by computer system 100. In the described embodiment(s), these devices include display screen 104, printer device 106, floppy disk drive 108, hard disk drive 110, and network interface 112. Keyboard controller 126 is used to receive input from keyboard 114 and send decoded symbols for each pressed key to microprocessor 116 over bus 128.

Display screen 104 is an output device that displays images of data provided by microprocessor 116 via peripheral bus 124 or provided by other components in computer system 100. Printer device 106 when operating as a printer provides an image on a sheet of paper or a similar surface. Other output devices such as a plotter, typesetter, etc. can be used in place of, or in addition to, printer device 106.

Floppy disk drive 108 and hard disk drive 110 can be used to store various types of data. Floppy disk drive 108 facilitates transporting such data to other computer systems, and hard disk drive 110 permits fast access to large amounts of stored data.

Microprocessor 116 together with an operating system operate to execute computer code and produce and use data. The computer code and data may reside on RAM 120, ROM 122, or hard disk drive 120. The computer code and data could also reside on a removable program medium and loaded or installed onto computer system 100 when needed. Removable program mediums include, for example, CD-ROM, PC-CARD, floppy disk and magnetic tape.

Network interface circuit 112 is used to send and receive data over a network connected to other computer systems. An interface card or similar device and appropriate software implemented by microprocessor 116 can be used to connect computer system 100 to an existing network and transfer data according to standard protocols.

Keyboard 114 is used by a user to input commands and other instructions to computer system 100. Other types of user input devices can also be used in conjunction with the present invention. For example, pointing devices such as a computer mouse, a track ball, a stylus, or a tablet can be used to manipulate a pointer on a screen of a general-purpose computer.

The present invention can also be embodied as computer readable code on a computer readable medium. The computer readable medium is any data storage device that can store data which can be thereafter be read by a computer system. Examples of the computer readable medium include read-only memory, random-access memory, magnetic data storage devices such as diskettes, and optical data storage devices such as CD-ROMs. The computer readable medium can also be distributed over a network coupled computer systems so that the computer readable code is stored and executed in a distributed fashion.

Figure 2:
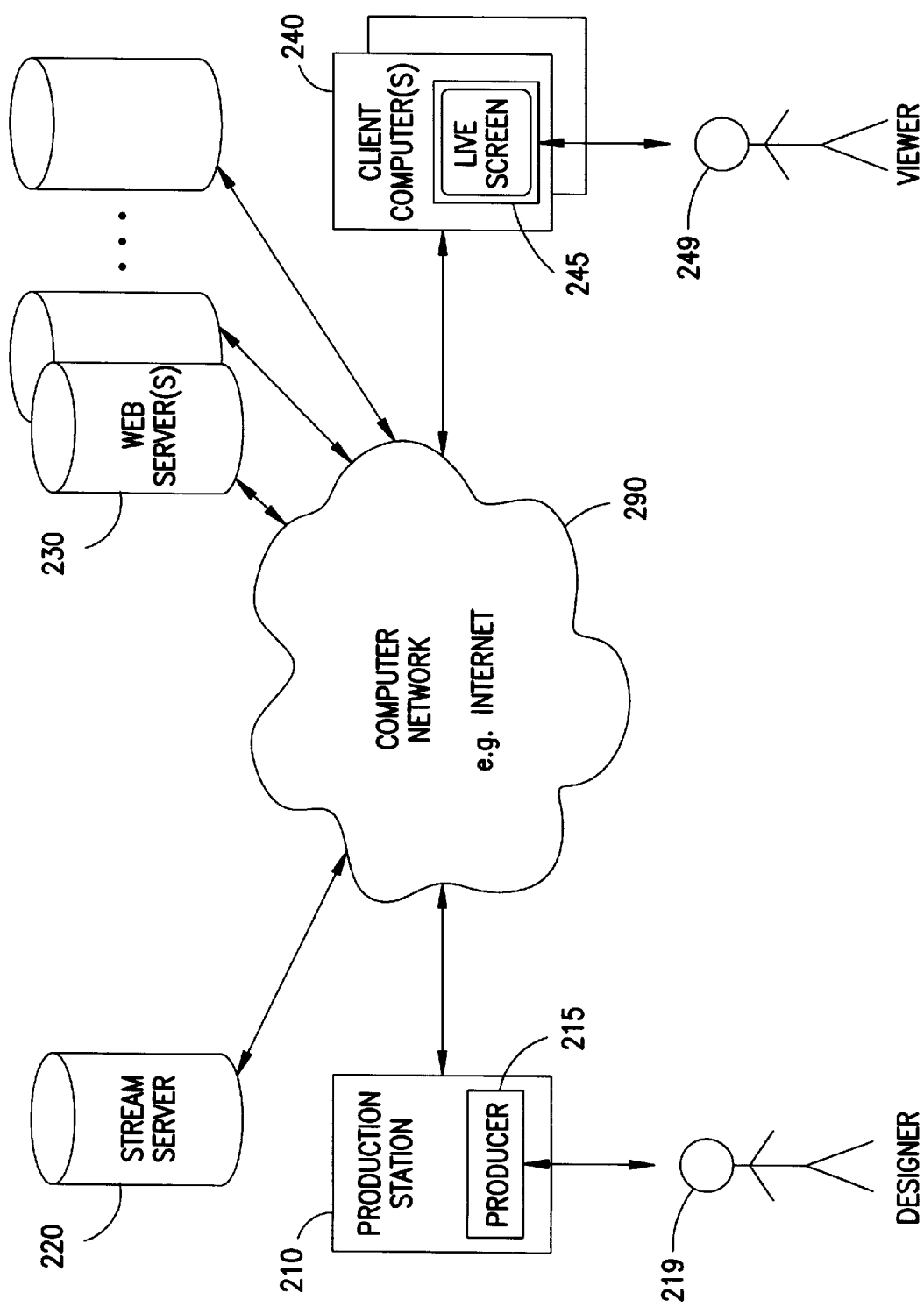
FIG. 2 is a block diagram showing an exemplary hardware environment for practicing the annotated video-on-demand (VOD) system of the present invention.

FIG. 2 is a block diagram showing an exemplary hardware environment for practicing the annotated video-on-demand (VOD) system of the present invention. The VOD system includes a production station 210, a stream server 220, at least one web server 230 and at least one client computer 240, each of which can be implemented using computer system 100 described above. Stream server 220 and web server 230 are coupled to client computer 240 via a computer network 290, e.g., the internet. Note that the disclosed hardware environment is exemplary. For example, production station 210 and stream server 220 can be implemented using two separate computer systems or using one computer system. In addition, if production station 210 and stream server 220 are implemented on separate computer systems as shown in FIG. 2, an optional direct connection (not shown) between production station 210 and stream server 220 can provide faster uploads of compressed video and annotation streams. In the following description, an audio stream optionally accompanies each video stream.

A producer 215, installed in production station 210, is a user-friendly tool for use by a designer 219 to create a synchronization script which includes annotation stream(s). The annotation stream(s) define the content(s) of a Live-Screen display 245 to be displayed on client computer 240 for a viewer 249. LiveScreen 245 display provides a graphical user interface (GUI) with multiple windows for synchronously displaying a video stream from stream server 220 and at least one displayable event stream. Examples of displayable events include textual/graphical information such as HTML-scripted web page(s) from web server 230.

Figure 3:
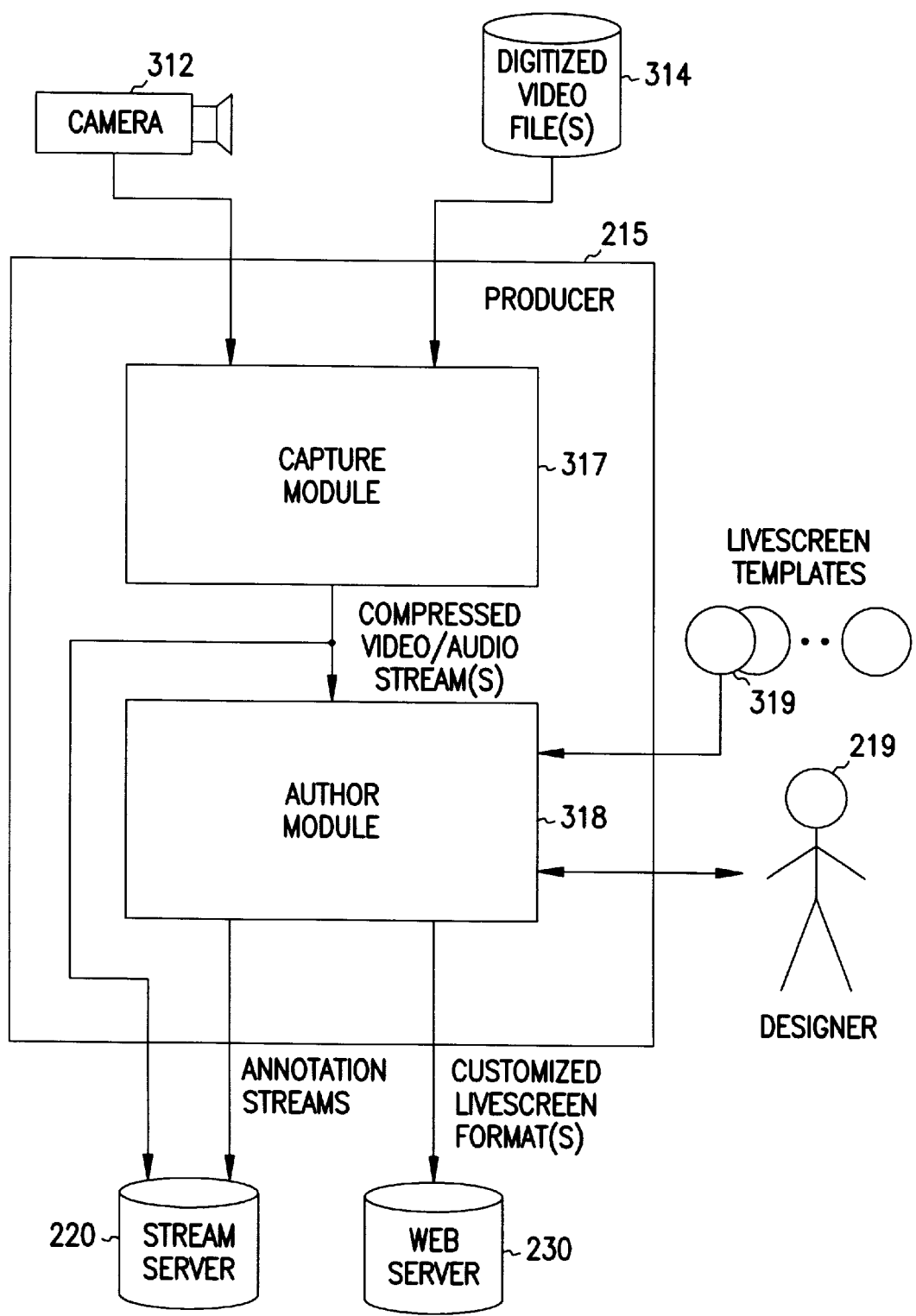
FIG. 3 is shows a producer which includes a capture module and an author module.

In one embodiment, as shown in FIG. 3, producer 215 includes a capture module 317 and an author module 318. Production station 210 includes 16 MB of RAM and a 1 GB hard disk drive for capturing and storing an uncompressed or precompressed video stream. Sources for generating video streams include a video camera 312, a video cassette recorder (VCR) (not shown) or a previously digitized video file 314, e.g., a Video for Windows (.avi) file. For ease of installation and use by designer 219, producer 215 is implemented in a host environment which includes a window-based operating system such as Microsoft Windows 95 and a web browser such as Netscape's Navigator 3.x. (Appendix A is a detailed user manual for one implementation of producer 215).

Figure 4A:
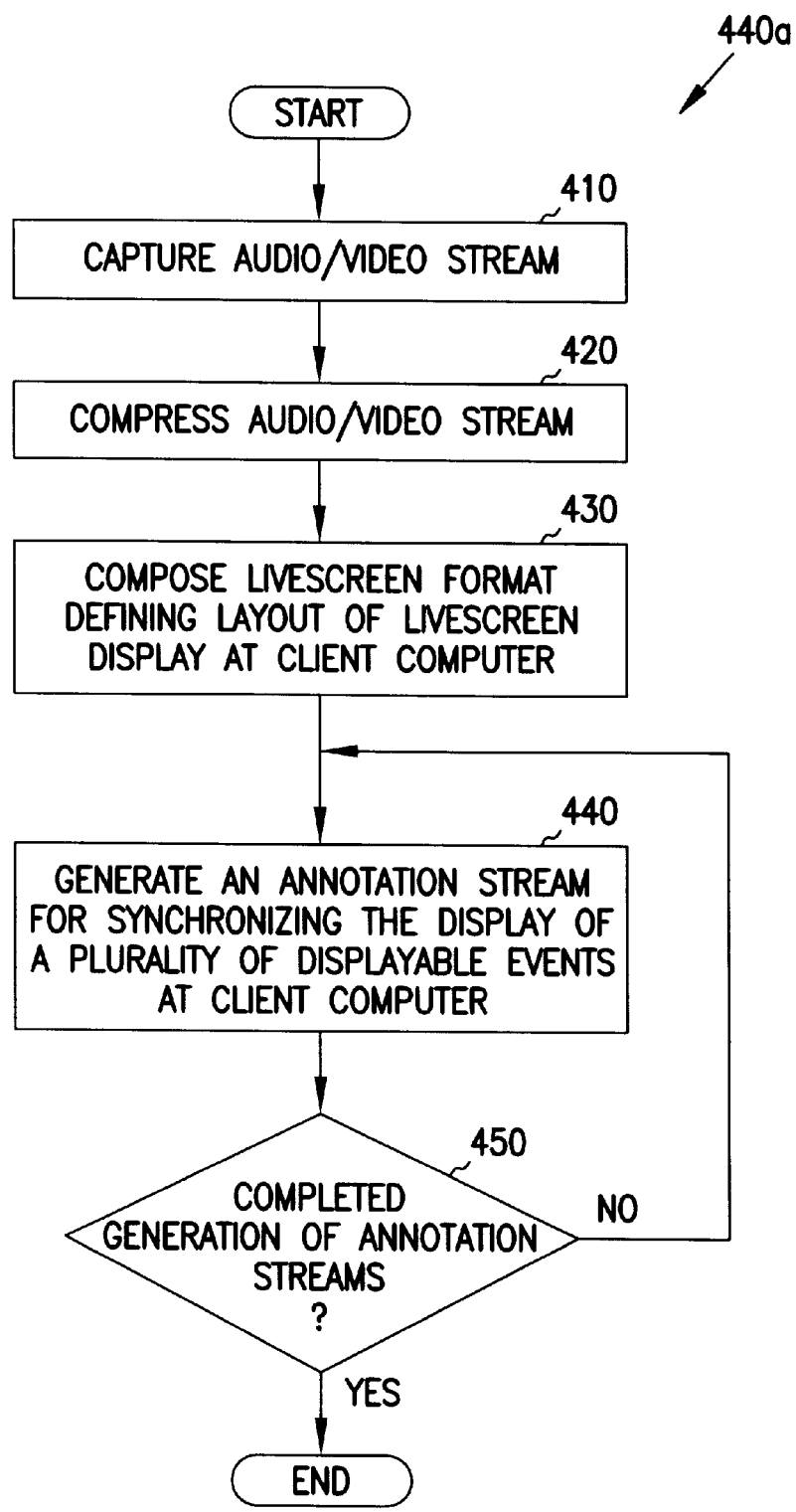
FIG. 4A is a flowchart illustrating the capture of a live video/audio stream from a video camera or from a previously stored video file.

Referring also to the flowchart of FIG. 4A, in step 410 capture module 317 captures a live video/audio stream from video camera 312 or from the previously stored video file 314. If video camera 312 provides an analog video stream, e.g., an NTSC signal, a hardware capture card (not shown) provides the required conversion from the analog video stream to a digitized video stream. Because temporary storage of uncompressed video data is memory intensive, some form of pre-compression can be used to reduce the memory storage requirement of the input video stream during capture step 410 and prior to compression step 420.

Figure 5:
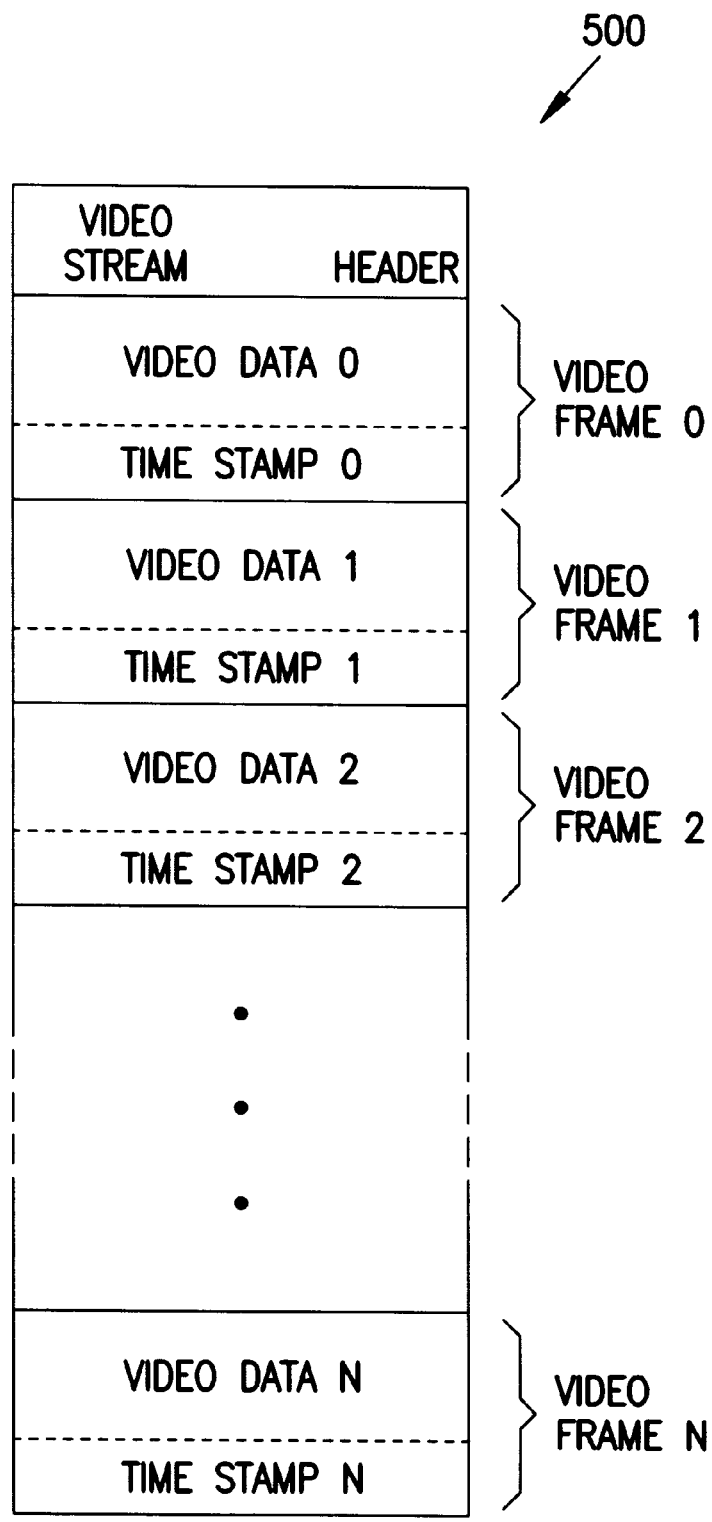
FIG. 5 shows an exemplary format for storing and delivering a compressed video stream.

In step 420, capture module 420 compresses the digitized video stream using a suitable compression technique. In this embodiment, depending on the bandwidth capacity of the connection provided by network 290 between stream server 220 and client computer 240, e.g., a POTS modem, ISDN or Ethernet, a suitable frame resolution and frame rate combination is selected. A compression algorithm based on the H263 standard (see co-pending applications VXT 702 and 718) is used for compressing lower bandwidth video streams, e.g., at less than 56 kbps. Alternatively, a Vxpress format (see co-pending application VXT 712) is used for compressing higher bandwidth video streams. FIG. 5 shows an exemplary format 500 for storing and delivering a compressed video stream.

A similar format can also be used to store and deliver a separate compressed audio stream. It is also possible to combine, e.g., interleave a compressed video and audio data into one stream for delivery. Audio encoders/decoders (codecs) are available from a number of commercial sources. Examples include ToolVox from Voxware Inc., 305 College Road East, Princeton, N.J. 08540, and QCELP from QUALCOMM Inc., 10555 Sorrento Valley Road, San Diego, Calif. 92121.

Figure 6:
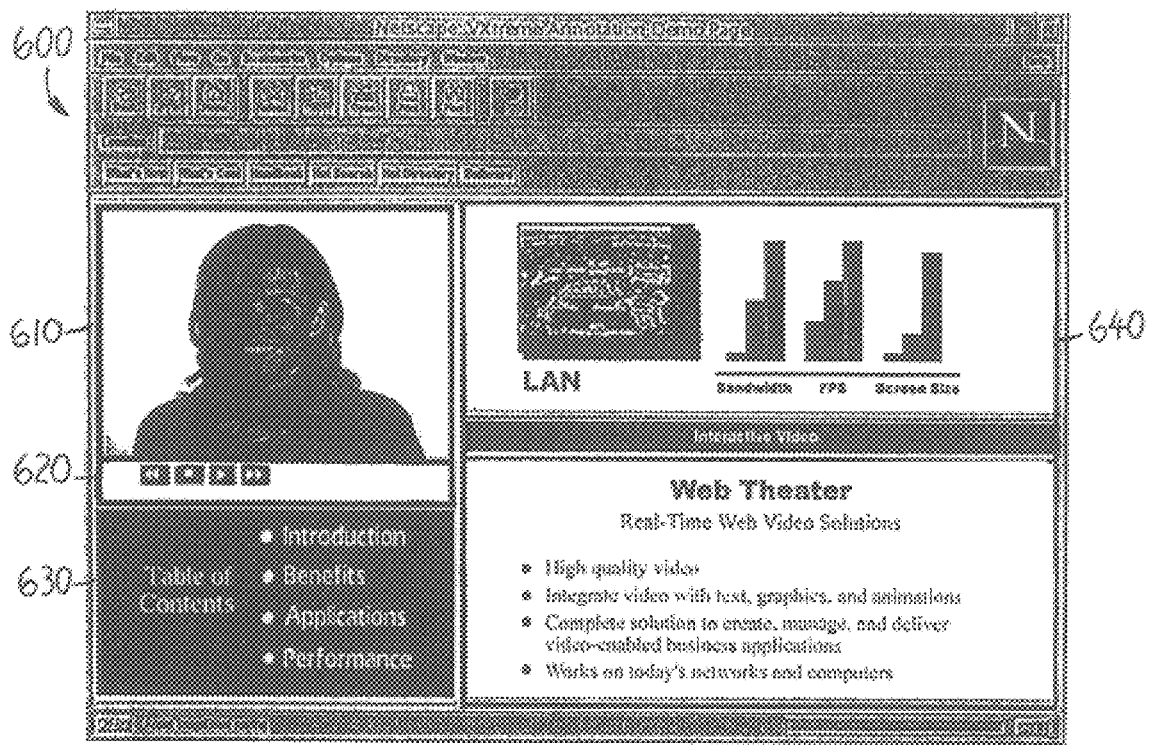
FIG. 6 shows an exemplary customized LiveScreen display which includes a video window, a set of VCR-like control buttons, a selectable table of contents (TOC) and an HTML page window.

Referring back to FIGS. 3 and 4A, in step 430, designer 219 uses author module 318 to compose a suitable Live-Screen display format which defines the layout of Live-Screen display 245 at client computer 240. FIG. 6 shows an exemplary customized LiveScreen display 600 which includes a video window 610, a set of VCR-like control buttons 620, a selectable table of contents (TOC) 630 and an HTML page window 640. Examples of other displayable event windows include but is not limited to ticker tape windows (not shown). In this implementation, LiveScreen templates 319 are available for designer 219 to use as starting points for composing customized LiveScreen formats.

Figure 7:
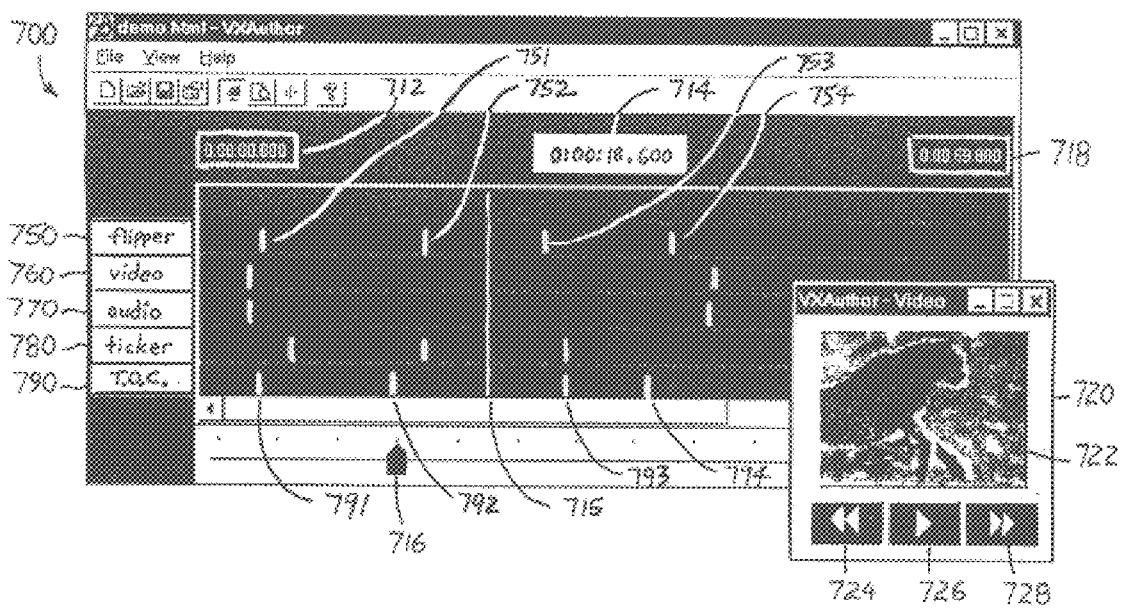
FIG. 7 illustrates an author tool provided by an author module for the designer to visually creating annotation streams.

FIG. 7 illustrates an author tool 700 provided by author module 318 for designer 219 to visually creating annotation streams (step 440). There are two types of annotation streams. The first type of annotation streams are data annotation streams in which the displayable event data are embedded within the annotation streams. Examples of data annotation streams include ticker annotation streams which include ticker tape data embedded within the annotation stream. The second type of annotation streams are locator annotation streams in which the displayable data is either too cumbersome and/or is continually evolving to be embedded as static data within the annotation stream. Instead, event locator(s) pointing to the location of the displayable data are stored in the annotation streams instead of the displayable data. Examples include URL addresses pointing to HTML pages.

Designer 219 may view frames from video stream 500 displayed in video window 720 for referencing and selecting appropriate time stamps to use in generating annotation streams. Within video window 720, VCR function buttons, e.g., a rewind button 724, a play button 726 and a fast forward button 728, are available for designer 219 to quickly traverse video stream 500. Since video window 720 is provided as a convenience for designer 219, if designer 219 has prior knowledge of the content of the video stream, designer 219 may proceed with the generation of the annotation streams without viewing video window 720.

As shown in FIG. 7, author tool 700 displays a flipper time track 750, a video time track 760, an audio time track 770, a ticker time track 780 and a table of contents (TOC) time track 790. Flipper time track 750 and ticker time track 780 aid designer 217 in generating a flipper annotation stream and a ticker annotation stream, respectively. Another visual control aid, zoom bar 716, enables designer 219 to select the respective portions of the complete time tracks 750, 760, 770, 780 and 790, as defined by start time indicator 712 and end time indicator 718, which is currently displayed by author tool 700.

In accordance with one aspect of the invention, annotation frames are generated by designer 217 to form customized annotation streams (step 440. A time hairline 715 spanning time tracks 750, 760, 770, 780 and 790 provides designer 217 with a visual aid to select an appropriate time, displayed in time indicator 714, for synchronizing a displayable event. The exemplary format of time indicators 712, 714 and 718 are "hours:minutes:seconds".

Figure 4B:
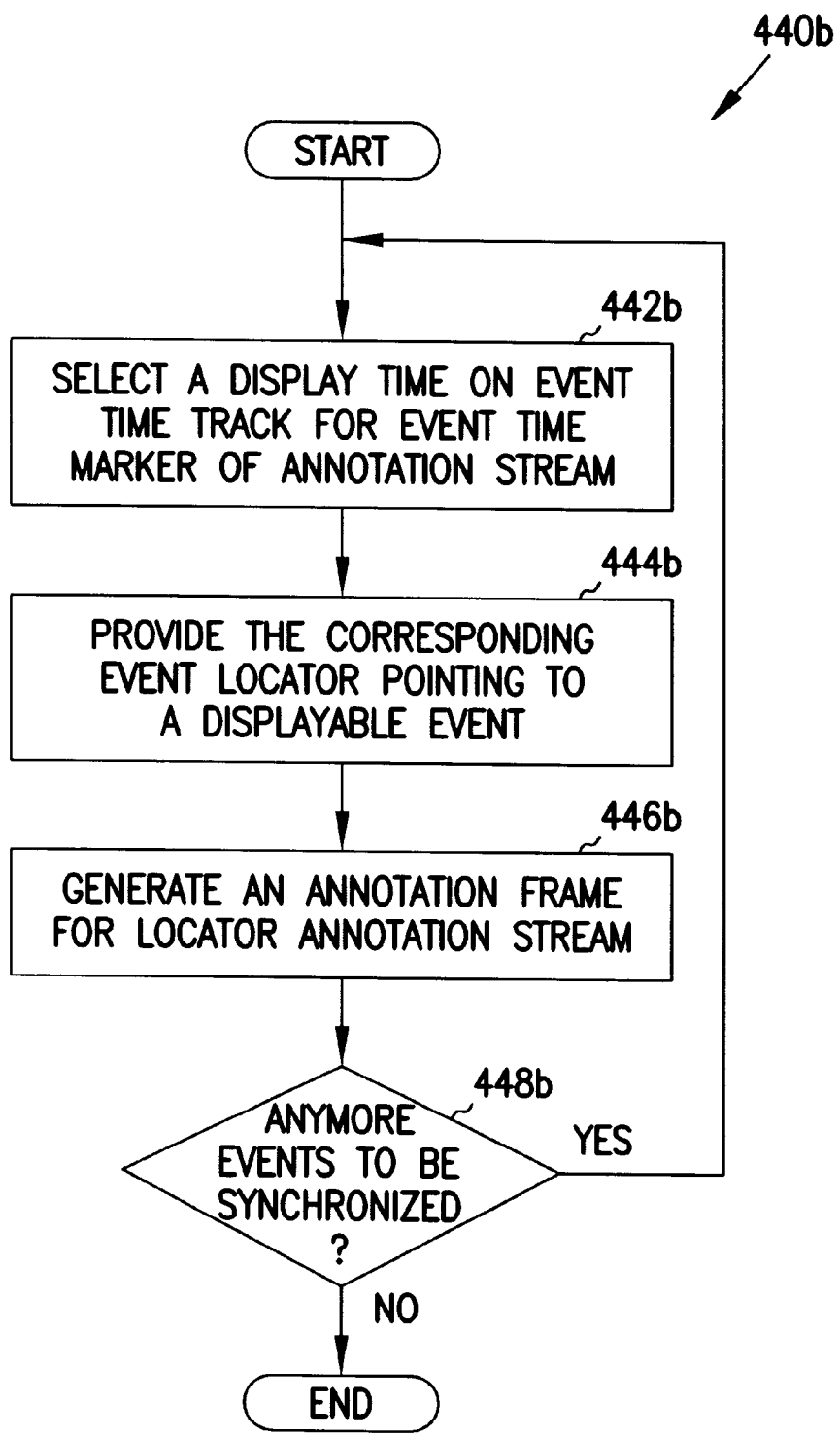
FIGS. 4B and 4C are flowcharts illustrating a locator annotation stream and a data annotation stream, respectively.
Figure 8A:
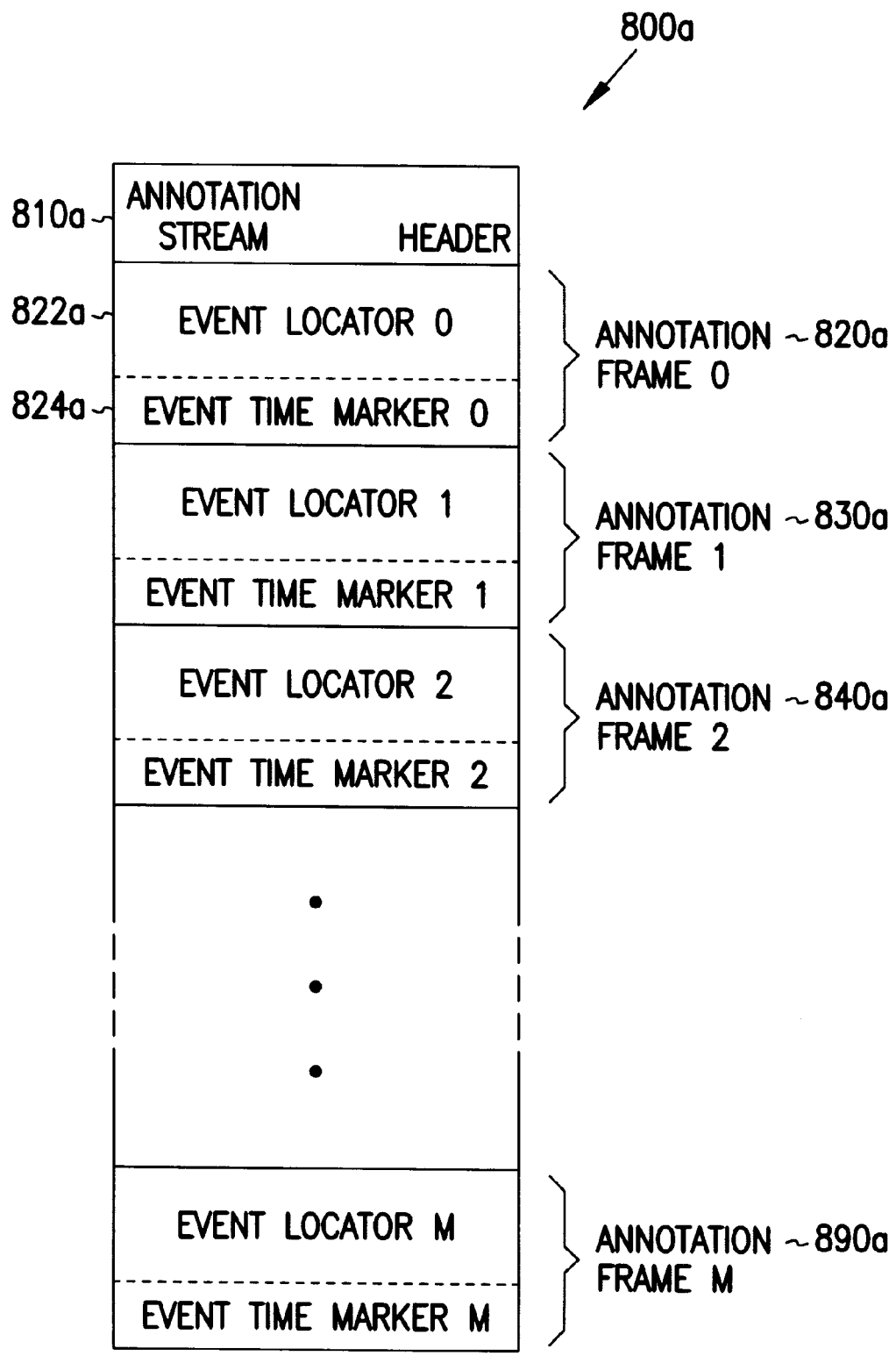
FIGS. 8A and 8B are exemplary formats illustrating a locator annotation stream and a data annotation stream, respectively.

FIGS. 4B and 8A are a flowchart and an exemplary format, respectively, illustrating a locator annotation stream 800a. Locator annotation stream 800a includes an annotation stream header 810a, and a plurality of annotation frames 820a, 830a, 840a, . . . 890a. Each annotation frame includes an event locator and an event time marker, e.g., annotation frame 820a includes event locator 822a and event time marker 824a. One example of a locator annotation stream is a flipper stream. Flipper time track 750 provides a convenient way to select suitable event time marker values, e.g., flipper time markers 751, 752, 753, 754, for the respective event locators. For example, URL addresses (event locators) pointing to HTML pages enable client computer 240 to subsequently retrieve textual and/or graphical elements to be displayed at predetermined time as defined by the time markers of the flipper stream.

Figure 4C:
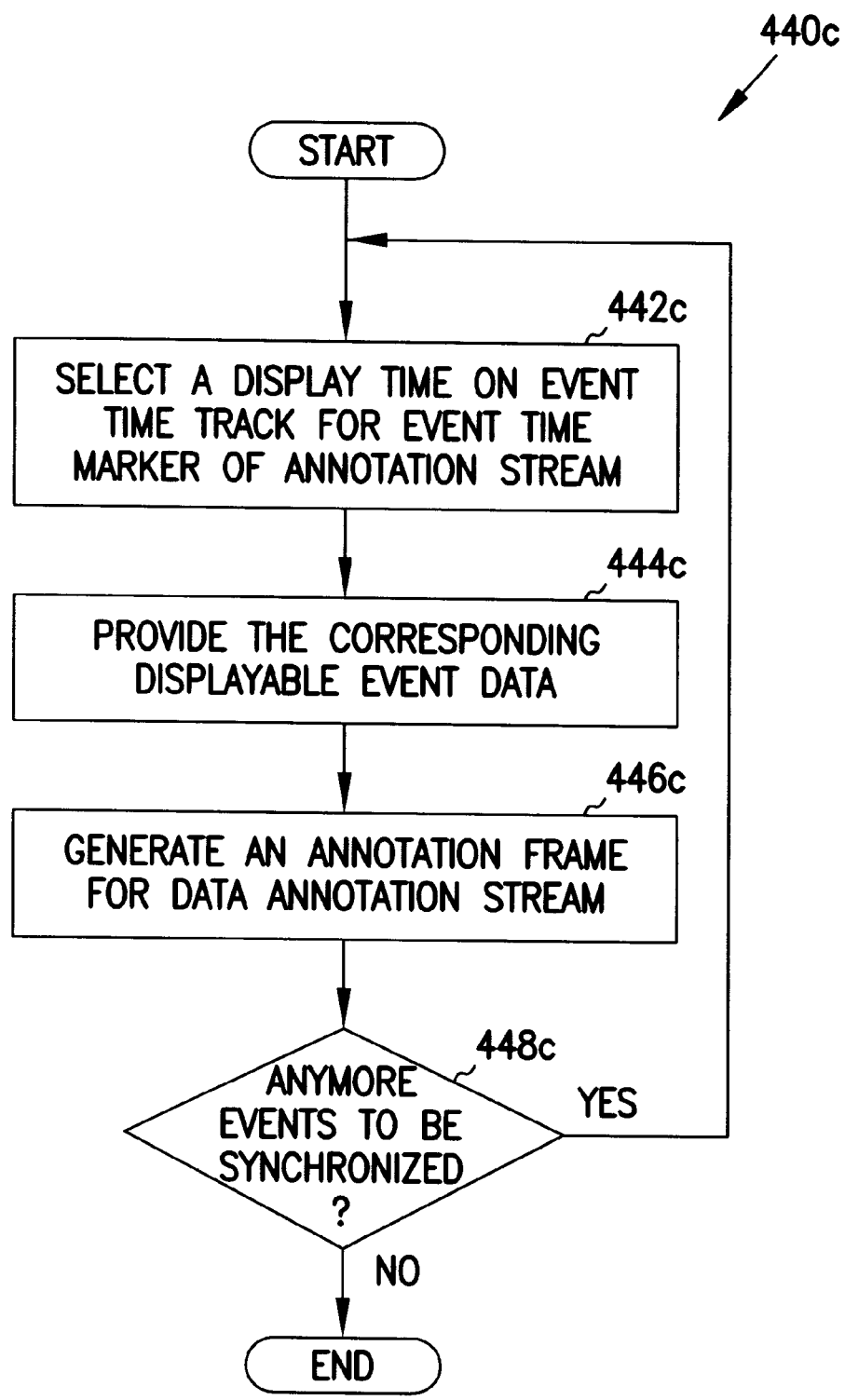
Figure 8B:
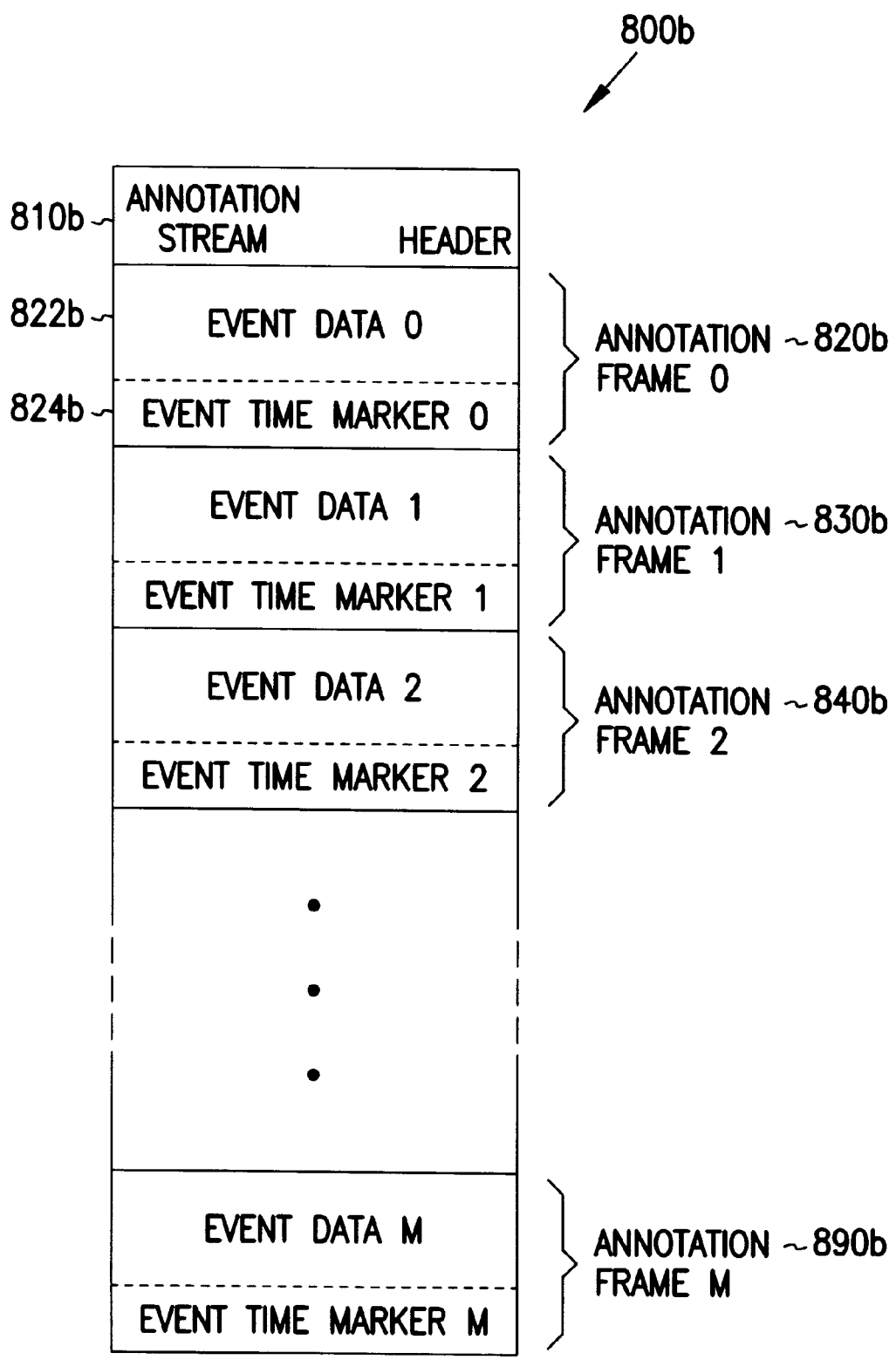

FIGS. 4C and 8B are a flowchart and an exemplary format, respectively, illustrating a data annotation stream 800b. Locator annotation stream 800a includes an annotation stream header 810a, and a plurality of annotation frames 820a, 830a, 840a, . . . 890a. Each annotation frame includes an event locator and an event time marker, e.g., annotation frame 820a includes event locator 822a and event time marker 824a. One example of a data annotation stream is a ticker stream. The generation of the ticker stream is somewhat similar to that of the flipper stream. However, in the case of the ticker stream, instead of event locators, displayable data is embedded directly into the ticker stream as event data.

When author module 318 has completed building an annotation stream, e.g., the flipper stream, the annotation stream is given a file name and loaded into a convenient server, e.g., stream server 220, for subsequent retrieval by client computer 240. The use of the annotation streams is described in greater detail below with the description of client computer 240.

In accordance with another aspect of the invention, LiveScreen display 600 also includes a table of contents (TOC) 630, enabling viewer 249 at client computer 240 to skip forward or backward to a point within the entire video/audio stream 500. TOC 630 include one or more content labels, each indexed to a corresponding time stamp in video stream 500, as defined by TOC time markers 791, 792, 793, 794 in LiveScreen display 600.

Figure 9:
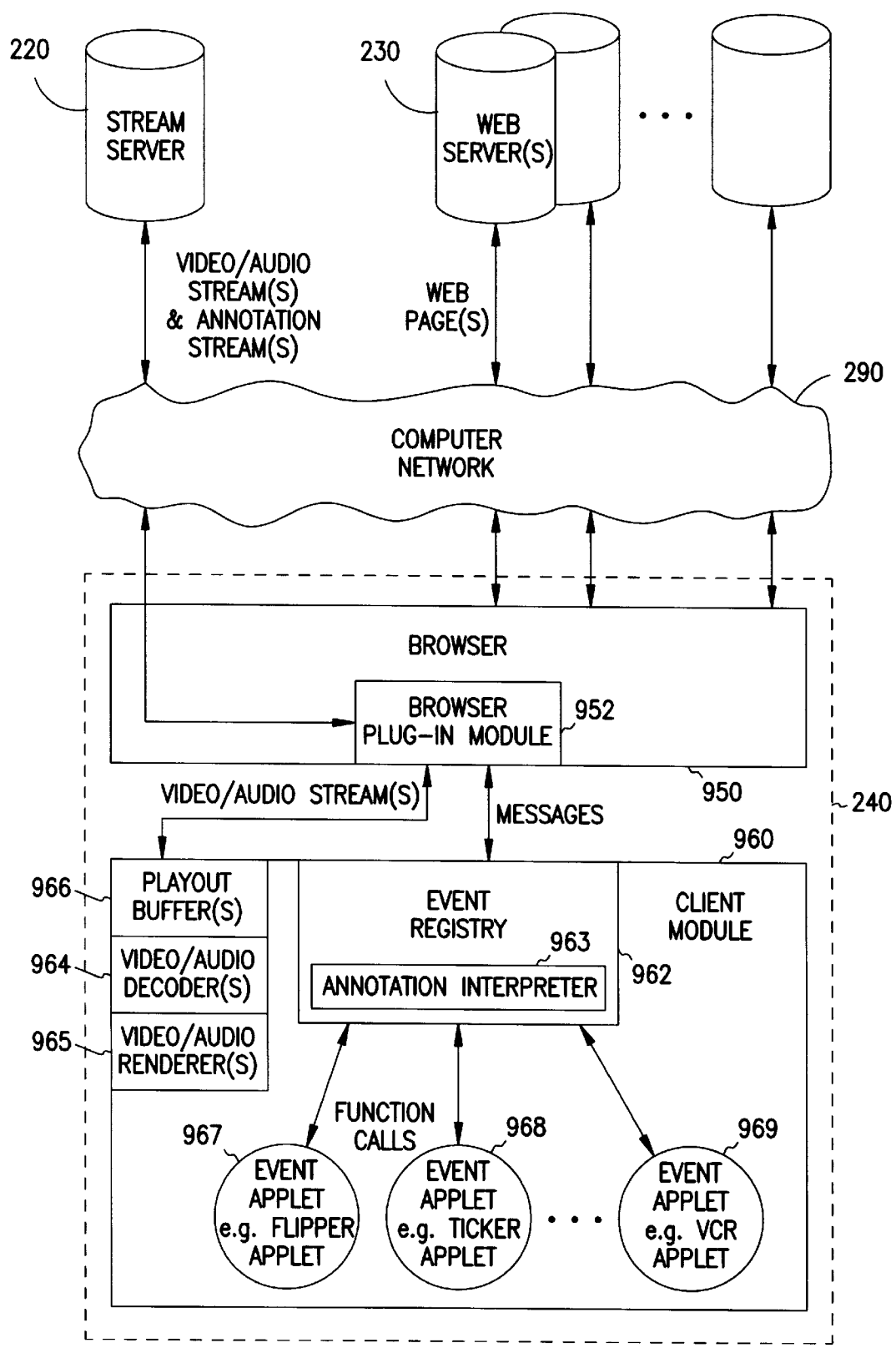
FIG. 9 illustrates one embodiment of the client computer which includes a web browser and a browser plug-in module for interfacing a web browser with a client module.

Referring now to FIG. 9, in one embodiment of the present invention, client computer 240 includes a web browser 950 and a browser plug-in module 952 for interfacing web browser 950 with a main client module 960. Client module 960 includes an event registry 962, playout buffer(s) 966, video/audio decoder(s) 964, video/audio renderer(s) 965 and one or more dynamically loadable event applet(s), e.g., flipper applet 967, ticker applet 968 and VCR applet 969. In this embodiment, event registry 962 also functions as an annotation interpreter 963.

Figure 10A:
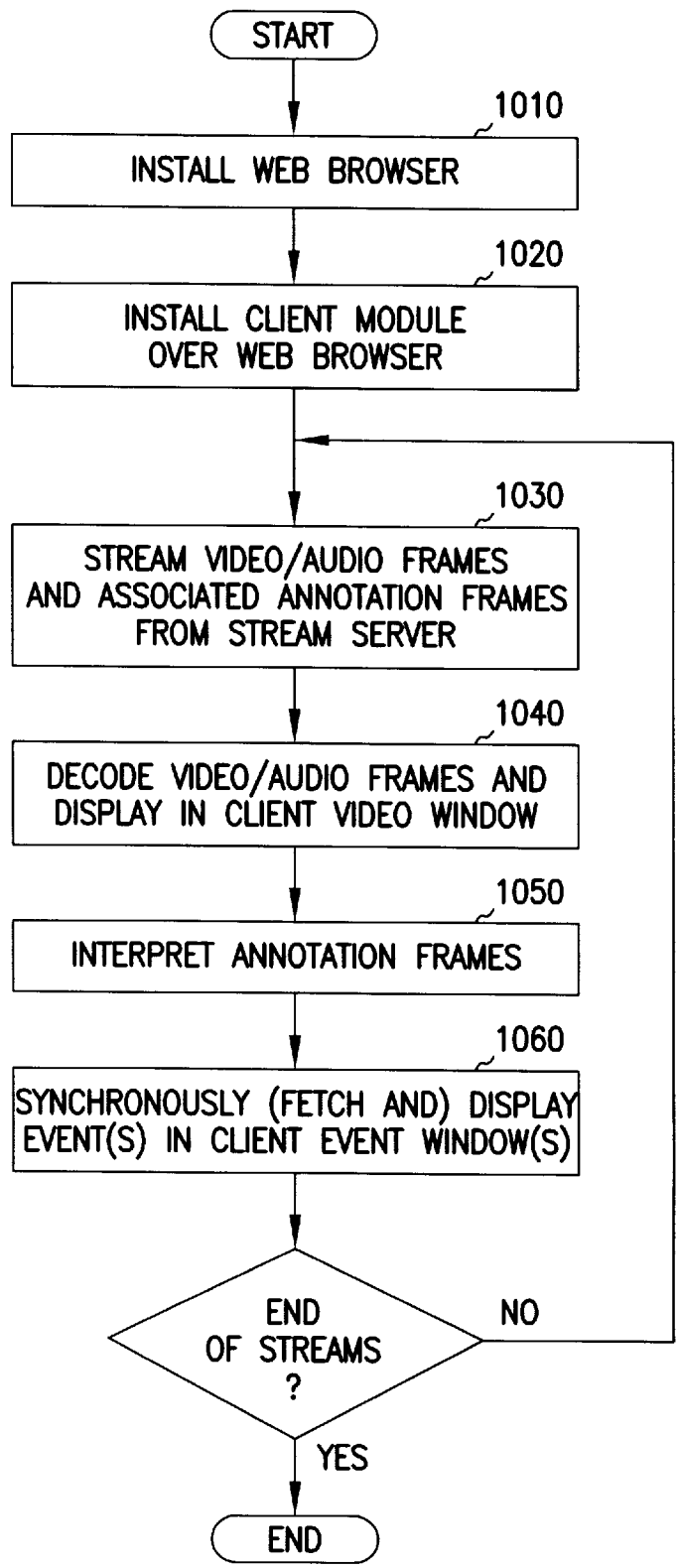
FIGS. 10A and 10B are flowcharts illustrating the operation of the client module.

FIG. 10A is a flowchart illustrating the operation of client module 960. Assume that viewer 249 has not previously loaded client module 960 in client computer 240, but has already loaded a web browser 950, e.g., Netscape's Navigator (step 1010). Viewer 249 surfs the world-wide web (www) via the internet and locates a web site of interest to viewer 249. Typically, the web site of interest is hosted on web server 230. Accordingly, a target web page is downloaded from web server 230 and displayed on client computer 240.

The target web page includes a link to a customized LiveScreen display, e.g., display 600. If client module 960 has not been previously loaded, client module 960 is now loaded over web browser 950 for processing video/audio and annotation streams (step 1020). Depending on the implementation, a copy of client module 960 may be available from the web site of interest. Alternatively, the target web page may provide a HTML link to another web server which has an updated copy of client module 960.

Figure 10B:
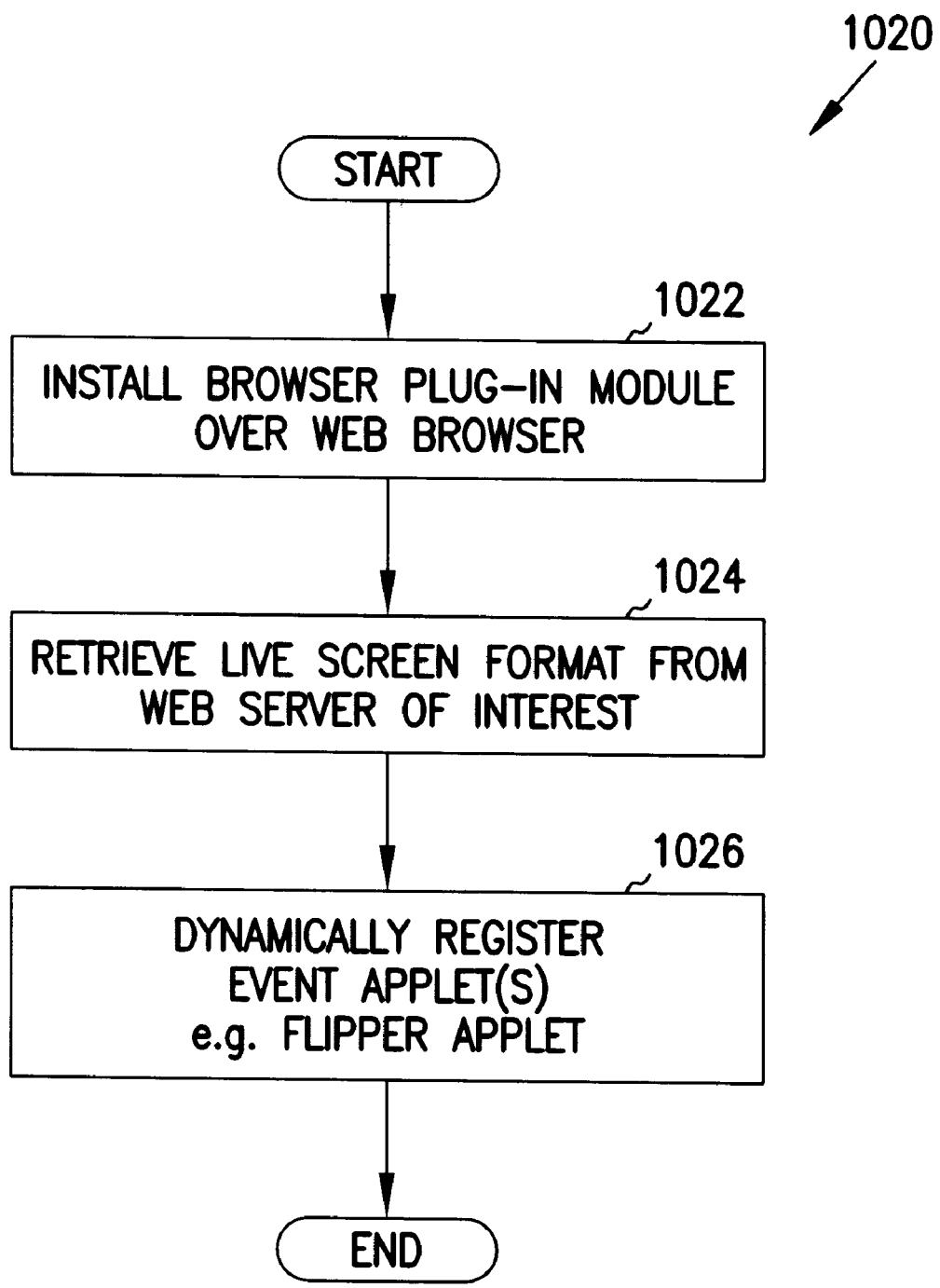

Referring now to FIG. 10B, first, browser plug-in module 952 is installed over web browser 950 (step 1022). As discussed above, plug-in module 952 provides the interface between client module 960 and web browser 950. The target web page provides a HTML link to the format for LiveScreen display 600. The LiveScreen display format is retrieved and display 600 is installed on client computer 240 using web browser 950 (step 1024).

Next, event registry 962 begins a registration/load process of the event applets, e.g., flipper applet 967, ticker applet 968 and VCR applet 969 (step 1026). Event registry 962 is capable of dynamically registering event applets, i.e., registry 962 is capable of registering additional event applets after the initial registration process, thereby making it possible to add new event windows to LiveScreen display 600 of client computer 240 without having to re-install client module 960. Each event applet has a tag which includes attributes such as Java class, command stream format RTP:// server name and file name (location of stream). During the registration process, each applet provides event registry 962 with a list of its respective function(s). Appendix B includes detailed instructions for interfacing event applets, coded in Java, with browser plug-in module 952.

Referring back to FIG. 10A, encoded video/audio frames and associated annotation frames are streamed from stream server 220 to client computer 240 for synchronous display (step 1030). Streaming video and audio streams over a network is very efficient because streaming eliminates the need for a large buffer at client computer 240. In addition, streaming also provides flexibility, e.g., switching video sources midstream is possible without wasting network resources since streaming is based on a pseudo just-in-time (JIT) protocol and does not involve downloads of the entire video stream prior to display at client computer 240. If the underlying transmission protocol is HTTP, then video, audio and annotation packets are initially "pulled" by client computer 240 from server 220 using HTTP "get" packet(s).

Next, the encoded video/audio streams are decoded by decoder 964, i.e., decompressed using a suitable technique, and then displayed at client computer 240 by renderer 965 (step 1040). (See co-pending applications VXT 702, 712 and 718).

In this implementation, annotation frames streamed from stream server 220 are encoded in Visual Basic script. As shown in FIGS. 8A and 8B, annotation streams 800a, 800b include stream headers 810*a*, 810*b*, respectively, followed by one or more annotation frames. Annotation interpreter 963 parses annotation frames in real-time in the form of messages from stream server 220, and converts the messages into a C++ function calls for the respective event applets (step 1050). In the case of flipper stream 800*a*, each annotation frame includes a HTML address and an event time marker. In the case of ticker stream 800*b*, each annotation frame includes ticker data and an event time marker. Note that an event time marker need not be identical to a corresponding video time stamp. Client computer 240 is capable of switching to a new displayable event together with a video frame or in between two video frames.

While the contents of annotation frames may differ, from the perspective of stream streamer 220, the event data or event locator are simply arguments to be passed on to client computer 240 to be processed by client computer 240. Hence, all annotation frames are processed in the same manner by stream server 220, i.e., annotation frames are streamed to client computer 240 at the appropriate time in accordance with their respective event time markers.

Further, since the video and annotation streams are handled synchronously but separately by video decoder 964 and annotation interpreter 963, respectively, steps 1040 and 1050 can occur concurrently or consecutively. As discussed above, event registry 962 is capable of dynamic registration of event applets. Accordingly, annotation interpreter 963 is adaptable, and capable of automatic installation and linking of new event applet(s) to add new class(es) of displayable events for client computer 240.

After registering with event registry 962, flipper applet 967 provides the location of the flipper stream to browser 950 which then begin receiving the flipper stream from stream server 220. Flipper annotation frames are provided by stream server 220 synchronously with the video/audio frames to client module 960 so that the annotations, i.e., displayable events can be synchronized for display at client computer 240 (step 1060). In this example, URL addresses, for synchronizing HTML page flips with video stream are provided to web browser 950 thereby permitting client computer 240 to subsequently retrieve and display various textual and graphical elements changing at predetermined points corresponding to the timeline of the video stream. Note that HTML pages can be retrieved from one or more web server(s) 230.

Similarly, after registering with event registry 962, ticker (tape) applet 968 provides the location of the ticker stream to browser 950 which then begins receiving the ticker stream from stream server 220. Ticker annotation frames are provided by stream server 220 synchronously with the video/audio frames so that the annotations, i.e., displayable ticker data can be synchronized for display at client computer 240 at predetermined points corresponding to the timeline of the video stream.

Many types and combinations of display windows and/or content are possible. For example, another window may be used to display documents delivered via a data annotation stream and a "PowerPoint" viewer. Another exemplary variation includes providing an annotation stream to an "ActiveX" object for viewing displayable event(s) associated with a HTML page.

After registration, VCR control applet 969 provides VCR-like control buttons 620 such as play, rewind, fast forward, pause, and live-play. Note that since VCR buttons are under the interactive control of viewer 249, activation points in the time line cannot be predicted in advance, and so no annotation stream is used. (See co-pending application VXT 704) Instead, when a VCR-type function such as rewind ("REW") is activated, VCR applet 969 sends an appropriate message is sent to stream server 220, which resets both the video/audio streams and annotation stream(s) to the viewer selected point in time.

Figure 11:
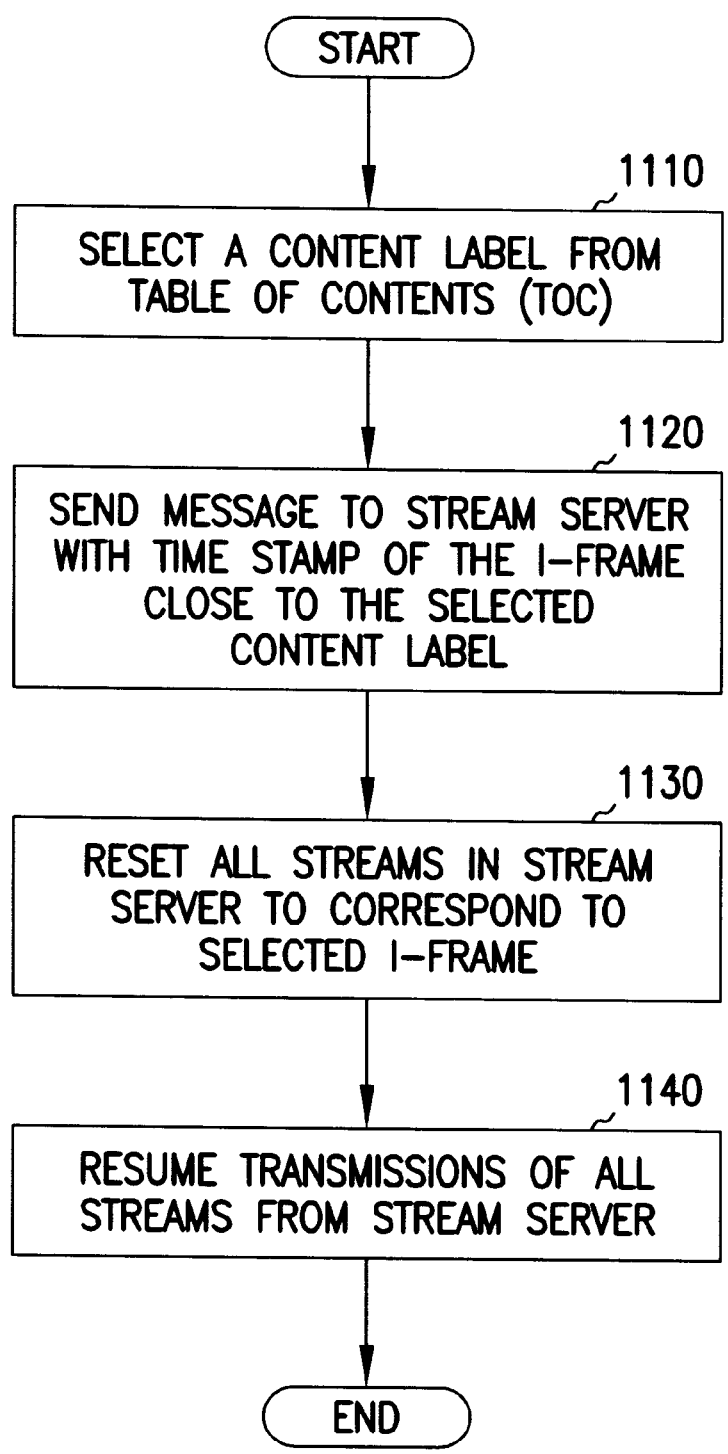
FIG. 11 is a flowchart illustrating the use of a table of content with content labels enabling a viewer to skip forward or backward to predetermined locations in the video/audio stream.

As shown in FIG. 11, a table of content 630 with content labels enables viewer 249 to skip forward or backward to predetermined locations in the video/audio stream. First, viewer 249 selects a content label of interest (step 1110). Examples of suitable content labels are section headings of the video stream. Next, client module 960 sends a message to stream server 220 with the time stamp of an I-frame from the video stream whose location is close to selected content label (step 1120). In this embodiment, an I-frame is a video frame which includes data for a complete video frame. Although computationally more intensive, it is also possible to select a P-frame and then reconstructed a complete video starting from a neighboring I-frame close to the selected P-frame.

In step 1130, stream server 220 resets the video/audio stream and the annotation stream(s) to correspond to the selected I-frame. Stream server 220 is now ready to resume transmission of the video/audio stream and the annotation stream(s) to client computer 240 for viewing (step 1140).

The present invention may be practiced with network performance improvement techniques such as dynamic bandwidth switching and selective retransmission. (See co-pending application VXT 706 and 711) Other techniques include additive layers with increasing transmission/retransmission priority, allowing client computer 240 to drop higher resolution/frame rate information which have been assigned lower priority (see VXT 603).

While this invention has been described in terms of several preferred embodiments, there are alterations, permutations, and equivalents which fall within the scope of this invention. For example, although the present invention is described using a H263-based and a vector quantization-based techniques, the methods and apparatuses of the present invention are equally applicable other compression/decompression techniques. It is therefore intended that the following appended claims be interpreted as including all such alterations, permutations, and equivalents as fall within the true spirit and scope of the present invention.

What is claimed is:

1. In a client computer having a processor, memory and a display device, said client computer coupled to a stream server and at least one web server via a network, a method for synchronizing the display of video frames of a video stream with the display of displayable events, said method comprising the steps of:

receiving a plurality of video frames of said video stream from said stream server for display in a video window of said display device, each said video frame associated with a time stamp;

displaying said video frames in said video window;

receiving a first plurality of annotation frames of a first annotation stream from said stream server;

interpreting said first plurality of annotation frames which is associated with a first selected subset of said video frames, each of said first plurality of annotation frames including an event locator and an event time marker, and wherein said event time markers of said first plurality of annotation frames corresponds to the respective time stamps of said first selected subset of video frames, and each said event locator points to one of a first plurality of displayable events stored in said at least one web server; and retrieving and synchronously displaying in a first event window of said display device the displayable event pointed to by the event locator of each of said first plurality of annotation frames whenever the event time marker of each of said first plurality of annotation frames matches the time stamp associated with the video frame currently being displayed in said video window.

2. The method of claim 1 wherein each said event locator of said first plurality of annotation frames is an URL address pointing to a HTML page.

3. The method of claim 1 further comprising the steps of:

receiving a second plurality of annotation frames of a second annotation stream from said stream server;

interpreting said second plurality of annotation frames, said second plurality of annotation frames associated with a second selected subset of said video frames, each of said second plurality of annotation frames including a corresponding one of a second plurality of displayable events and an event time marker, and wherein said event time markers of said second plurality of annotation frames corresponds to the respective time stamps of said second selected subset of video frames; and synchronously displaying in a second event window of said display device said one corresponding displayable event whenever the event time marker of each of said second plurality of annotation frames matches the time stamp associated with the video frame currently being displayed in said video window.

4. The method of claim 1 wherein said video server and said web server are part of a server computer system.

5. The method of claim 3 wherein said second plurality of displayable events include ticker data.

6. In a stream server having a processor and memory, said stream server coupled to a client computer and at least one web server via a network, said client computer having a processor, memory and a display device, a method for streaming video and annotation streams to synchronize the display of video frames of a video stream with the display of displayable events, said method comprising the steps of:

streaming a plurality of video frames of said video stream from said stream server to said client computer for display in a video window of said display device, each said video frame associated with a time stamp; and synchronously streaming a first plurality of annotation frames of a first annotation stream from said stream server to said client computer, said first plurality of annotation frames associated with a first selected subset of said video frames, each of said first plurality of annotation frames including an event locator and an event time marker, and wherein each said event locator points to one of a first plurality of displayable events stored in said at least one web server, said event time markers of said first plurality of annotation frames corresponds to the respective time stamps of said first selected subset of video frames, and said video stream and said first annotation stream are synchronized using said respective time stamps of said first selected subset of said video frames and said event time markers of said first plurality of annotation frames.

7. The method of claim 6 wherein each said event locator of said plurality of annotation frames is an URL address pointing to a HTML page.

8. The method of claim 6 wherein comprising the step of:

synchronously streaming a second plurality of annotation frames of a second annotation stream from said stream server to said client computer, said second plurality of annotation frames associated with a second selected subset of said video frames, each of said second plurality of annotation frames including a corresponding one of a second plurality of displayable events and an event time marker, and wherein said event time markers of said second plurality of annotation frames corresponds to the respective time stamps of said second selected subset of video frames, and said video stream and said annotation stream are synchronized using said respective time stamps of said second selected subset of said video frames and said event time markers of said second plurality of annotation frames.

9. The method of claim 8 wherein said second plurality of displayable events include ticker data.

10. In a client computer having a processor, memory and a display device, said client computer coupled to a stream server via a network, a method for synchronizing the display of video frames of a video stream and the display of a plurality of displayable events, wherein said video stream and said plurality of displayable events are to be displayed concurrently in a video window and an event window, respectively, of said display device, said method comprising the steps of:

receiving a plurality of video frames of said video stream from said stream server for display in said video window, each said video frame associated with a time stamp;

displaying said video frames in said video window;

receiving a plurality of annotation frames of an annotation stream from said stream server;

interpreting said plurality of annotation frames, said plurality of annotation frames associated with a selected subset of said video frames, each of said plurality of annotation frames including a corresponding one of said displayable events and an event time marker, and wherein said event time markers of said plurality of annotation frames corresponds to the respective time stamps of said selected subset of video frames; and synchronously displaying in said event window said one corresponding displayable event whenever the event time marker of each of said plurality of annotation frames matches the time stamp associated with the video frame currently being displayed in said video window.

11. The method of claim 10 wherein said displayable events include ticker data.

12. In a stream server having a processor and memory, said stream server coupled to a client computer via a network, said client computer having a processor, memory and a display device, a method for streaming video and annotation streams to synchronize the display of video frames of said video stream with the display of a plurality of displayable events, wherein said video stream and said plurality of displayable events are to be displayed concurrently in a video window and a first event window, respectively, of said display device, said method comprising the steps of:

streaming a plurality of video frames of said video stream from said stream server to said client computer for display in said video window, each said video frame associated with a time stamp; and synchronously streaming a plurality of annotation frames of an annotation stream from said stream server to said client computer, said plurality of annotation frames associated with a selected subset of said video frames, each of said plurality of annotation frames including a corresponding one of said displayable events and an event time marker, and wherein said event time markers of said plurality of annotation frames corresponds to the respective time stamps of said selected subset of video frames, and said video stream and said annotation stream are synchronized using said respective time stamps and said event time markers.

13. The method of claim 12 wherein said displayable events include ticker data.

14. A client computer useful in association with a stream server and at least one web server, said client computer comprising:

a playout buffer configured to receive a plurality of video frames of a video stream from said stream server, each said video frame associated with a time stamp;

an annotation interpreter configured to receive and interpret a first plurality of annotation frames of a first annotation stream from said stream server, said first plurality of annotation frames associated with a first selected subset of said video frames, each of said first plurality of annotation frames including an event locator and an event time marker, and wherein said event time markers of said first plurality of annotation frames corresponds to the respective time stamps of said first selected subset of video frames, and each said event locator points to one of a first plurality of displayable events stored in said at least one web server; and a display device configured to display said video frames in a video window of said display device and further configured to synchronously display in a first event window of said display device the displayable event pointed to by the event locator of each of said first plurality of annotation frames whenever the event time marker of each of said first plurality of annotation frames matches the time stamp associated with the video frame currently being displayed in said video window.

15. The client computer of claim 14 wherein each said event locator of said first plurality of annotation frames is an URL address pointing to a HTML page.

16. The client computer of claim 15 wherein:

said annotation interpreter is further configured to interpret a second plurality of annotation frames of a second annotation stream from said stream server, said second plurality of annotation frames associated with a second selected subset of said video frames, each of said second plurality of annotation frames including a corresponding one of a second plurality of displayable events and an event time marker, and wherein said event time markers of said second plurality of annotation frames corresponds to the respective time stamps of said second selected subset of video frames; and said display device is further configured to synchronously display in a second event window of said display device said one corresponding displayable event whenever the event time marker of each of said second plurality of annotation frames matches the time stamp associated with the video frame currently being displayed in said video window.

17. The client computer of claim 14 wherein said video server and said web server are part of a server computer system.

18. The client computer of claim 16 wherein said second plurality of displayable events include ticker data.

19. A stream server useful in association with a client computer and at least one web server, said client computer having a display device, the stream server comprising:

memory configured to store a plurality of video frames of said video stream to be streamed from said stream server to said client computer for display in a video window of said display device, each said video frame associated with a time stamp; and wherein said memory is further configured to store a first plurality of annotation frames of a first annotation stream to be synchronously streamed from said stream server to said client computer, said first plurality of annotation frames associated with a first selected subset of said video frames, each of said first plurality of annotation frames including an event locator and an event time marker, and wherein each said event locator points to one of a first plurality of displayable events stored in said at least one web server, said event time markers of said first plurality of annotation frames corresponds to the respective time stamps of said first selected subset of video frames, and said video stream and said first annotation stream are synchronized using said respective time stamps of said first selected subset of said video frames and said event time markers of said first plurality of annotation frames.

20. The stream server of claim 19 wherein each said event locator of said plurality of annotation frames is an URL address pointing to a HTML page.

21. The stream server of claim 19 wherein said memory is further configured to store a second plurality of annotation frames of a second annotation stream to be synchronously streamed from said stream server to said client computer, said second plurality of annotation frames associated with a second selected subset of said video frames, each of said second plurality of annotation frames including a corresponding one of a second plurality of displayable events and an event time marker, and wherein said event time markers of said second plurality of annotation frames corresponds to the respective time stamps of said second selected subset of video frames, and said video stream and said annotation stream are synchronized using said respective time stamps of said second selected subset of said video frames and said event time markers of said second plurality of annotation frames.

22. The stream server of claim 21 wherein said second plurality of displayable events include ticker data.

23. A client computer useful in association with a stream server, said client computer comprising:

a playout buffer configured to receive a plurality of video frames of said video stream from said stream server, each said video frame associated with a time stamp;

an annotation interpreter configured to receive and interpret a plurality of annotation frames of an annotation stream from said stream server, said plurality of annotation frames associated with a selected subset of said video frames, each of said plurality of annotation frames including a corresponding one of said displayable events and an event time marker, and wherein said event time markers of said plurality of annotation frames corresponds to the respective time stamps of said selected subset of video frames; and a display device configured to display said video frames in a video window of said display device, and further configured to synchronously display in an event window of said display device said one corresponding displayable event whenever the event time marker of each of said plurality of annotation frames matches the time stamp associated with the video frame currently being displayed in said video window.

24. The client computer of claim 23 wherein said displayable events include ticker data.

25. A stream server useful in association with a client computer, said client computer having a display device, the stream server comprising:

memory configured to store a plurality of video frames of said video stream to be streamed from said stream server to said client computer for display in a video window of said display device, each said video frame associated with a time stamp; and wherein said memory is further configured to store a plurality of annotation frames of an annotation stream to be synchronously streamed from said stream server to said client computer, said plurality of annotation frames associated with a selected subset of said video frames, each of said plurality of annotation frames including a corresponding one of a plurality of displayable events and an event time marker, and wherein said event time markers of said plurality of annotation frames corresponds to the respective time stamps of said selected subset of video frames, and said video stream and said annotation stream are synchronized using said respective time stamps of said selected subset of said video frames and said event time markers of said plurality of annotation frames.

26. The stream server of claim 25 wherein said displayable events include ticker data.

27. A computer-readable medium useful in association with a client computer having a processor, memory and a display device, said client computer coupled to a stream server and at least one web server via a network, the computer-readable medium comprising computer-readable code instructions configured to cause said client computer to execute the steps of:

receiving a plurality of video frames of a video stream from said stream server for display in a video window of said display device, each said video frame associated with a time stamp;

displaying said video frames in said video window;

receiving a first plurality of annotation frames of a first annotation stream from said stream server;

interpreting said first plurality of annotation frames which is associated with a first selected subset of said video frames, each of said first plurality of annotation frames including an event locator and an event time marker, and wherein said event time markers of said first plurality of annotation frames corresponds to the respective time stamps of said first selected subset of video frames, and each said event locator points to one of a first plurality of displayable events stored in said at least one web server; and retrieving and synchronously displaying in a first event window of said display device the displayable event pointed to by the event locator of each of said first plurality of annotation frames whenever the event time marker of each of said first plurality of annotation frames matches the time stamp associated with the video frame currently being displayed in said video window.

28. The computer-readable medium of claim 27 wherein each said event locator of said first plurality of annotation frames is an URL address pointing to a HTML page.

29. The computer-readable medium of claim 27 further comprising computer-readable code instructions configured to cause said client computer to execute the steps of:

receiving a second plurality of annotation frames of a second annotation stream from said stream server;

interpreting said second plurality of annotation frames, said second plurality of annotation frames associated with a second selected subset of said video frames, each of said second plurality of annotation frames including a corresponding one of a second plurality of displayable events and an event time marker, and wherein said event time markers of said second plurality of annotation frames corresponds to the respective time stamps of said second selected subset of video frames; and synchronously displaying in a second event window of said display device said one corresponding displayable event whenever the event time marker of each of said second plurality of annotation frames matches the time stamp associated with the video frame currently being displayed in said video window.

30. The computer-readable medium of claim 27 wherein said video server and said web server are part of a server computer system.

31. The computer-readable medium of claim 29 wherein said second plurality of displayable events include ticker data.

32. A computer-readable medium useful in association with a stream server having a processor and memory, said stream server coupled to a client computer and at least one web server via a network, said client computer having a processor, memory and a display device, the computer-readable medium comprising computer-readable code instructions configured to cause said stream server to execute the steps of:

streaming a plurality of video frames of a video stream from said stream server to said client computer for display in a video window of said display device, each said video frame associated with a time stamp; and synchronously streaming a first plurality of annotation frames of a first annotation stream from said stream server to said client computer, said first plurality of annotation frames associated with a first selected subset of said video frames, each of said first plurality of annotation frames including an event locator and an event time marker, and wherein each said event locator points to one of a first plurality of displayable events stored in said at least one web server, said event time markers of said first plurality of annotation frames corresponds to the respective time stamps of said first selected subset of video frames, and said video stream and said first annotation stream are synchronized using said respective time stamps of said first selected subset of said video frames and said event time markers of said first plurality of annotation frames.

33. The computer-readable medium of claim 32 wherein each said event locator of said plurality of annotation frames is an URL address pointing to a HTML page.

34. The computer-readable medium of claim 32 further comprising computer-readable code instructions configured to cause said stream server to execute the step of:

synchronously streaming a second plurality of annotation frames of a second annotation stream from said stream server to said client computer, said second plurality of annotation frames associated with a second selected subset of said video frames, each of said second plurality of annotation frames including a corresponding one of a second plurality of displayable events and an event time marker, and wherein said event time markers of said second plurality of annotation frames corresponds to the respective time stamps of said second selected subset of video frames, and said video stream and said annotation stream are synchronized using said respective time stamps of said second selected subset of said video frames and said event time markers of said second plurality of annotation frames.

35. The computer-readable medium of claim 34 wherein said second plurality of displayable events include ticker data.

36. A computer-readable medium useful in association with a client computer having a processor, memory and a display device, said client computer coupled to a stream server via a network, the computer-readable medium comprising computer-readable code instructions configured to cause said client computer to execute the steps of:

receiving a plurality of video frames of a video stream from said stream server for display in a video window of said display device, each said video frame associated with a time stamp;

displaying said video frames in said video window;

receiving a plurality of annotation frames of an annotation stream from said stream server;

interpreting said plurality of annotation frames, said plurality of annotation frames associated with a selected subset of said video frames, each of said plurality of annotation frames including a corresponding one of a plurality of displayable events and an event time marker, and wherein said event time markers of said plurality of annotation frames corresponds to the respective time stamps of said selected subset of video frames; and synchronously displaying in an event window of said display device said one corresponding displayable event whenever the event time marker of each of said plurality of annotation frames matches the time stamp associated with the video frame currently being displayed in said video window.

37. The client computer of claim 36 wherein said displayable events include ticker data.

38. A computer-readable medium useful in association with a stream server having a processor and memory, said stream server coupled to a client computer via a network, said client computer having a processor, memory and a display device, the computer-readable medium comprising computer-readable code instructions configured to cause said stream server to execute the steps of:

streaming a plurality of video frames of a video stream from said stream server to said client computer for display in a video window of said display device, each said video frame associated with a time stamp; and synchronously streaming a plurality of annotation frames of an annotation stream from said stream server to said client computer, said plurality of annotation frames associated with a selected subset of said video frames, each of said plurality of annotation frames including a corresponding one of said displayable events and an event time marker, and wherein said event time markers of said plurality of annotation frames corresponds to the respective time stamps of said selected subset of video frames, and said video stream and said annotation stream are synchronized using said respective time stamps and said event time markers.

39. The stream server of claim 38 wherein said displayable events include ticker data.

* * * * *